United States Patent Office 2,700,046
Patented Jan. 18, 1955

2,700,046

SODIUM-4,4'-BIS(3,4-METHYLENEDIOXY-BENZOYLAMINO)-STILBENE-2,2'-DISULFONATE

James William Libby, Jr., Wilmington Manor, and Stanley Earl Krahler, Wilmington, Del., assignors to E. I. du Pont de Nemours & Company, Wilmington, Del., a corporation of Delaware No Drawing. Application October 26, 1949, Serial No. 123,799

4 Claims. (Cl. 260—340.5)

This invention relates to new blue-fluorescent dyestuffs and more particularly to benzoylamino-stilbene-disulfonic acids substituted in the benzoyl nuclei with an alkylenedioxy grouping.

It is an object of this invention to provide new cellulose-substantive, blue-fluorescent dyestuffs, which are useful particularly for imparting whiteness to textile materials and related cellulosic fibers. Other and further important objects of this invention will appear as the description proceeds.

In copending application Serial No. 29,664, now abandoned it is taught that 4,4'-dibenzoyl-diamino-2,2'-disulfostilbenes which carry in each benzoyl ring two alkyloxy radicals in the positions 3,4 are substantive to cellulose and are characterized particularly by a pronounced bluish fluorescence, when illuminated by ultra-violet light. Thus, the compounds are characterized by absorption of light in the ultra-violet spectrum, with at least one absorption maximum within the region of 3000 to 4000 Angstrom units. When cellulosic material, for instance textile fabric or paper, is treated with an aqueous solution of one of these compounds and then exposed to ultra-violet radiation, the cellulosic material glows with a bluish fluorescence.

We have now found that whitening agents of good potency are obtained also by selecting for the purpose a bis-benzoylamino-stilbene disulfonate carrying in each benzoyl nucleus a lower alkylene-dioxy group, which is disposed in positions 3,4 the position of the CONH group being counted as 1, and the benzoyl radical being free of other substituents. Expressed in different words, we have discovered new and superior blue-fluorescents in a limited group of compounds characterized by the following structure:

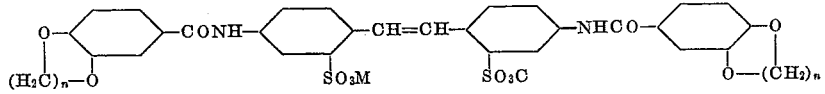

wherein $n$ is a small integer, for instance 1 or 2, while M represents hydrogen, or a suitable cation, for instance sodium, potassium, ammonium, trimethyl-ammonium, pyridinium, etc.

The new compounds may be prepared by methods which are per se known in the art, or by the special, improved procedure illustrated in the following example, wherein parts mentioned are by weight.

A mixture of 25 parts of 4,4'-diamino-stilbene-2,2'-disulfonic acid, 31.4 parts of 3,4-methylenedioxy-benzoyl chloride (i. e. the acid chloride of piperonylic acid; made according to the method of Barger, J. Chem. Soc., vol. 93, page 563) and 150 parts of pyridine was heated at reflux for 1 hour. At the end of this time the reaction was not quite complete, as shown by treatment of a small portion of the reaction mixture with cold nitrous acid and alkaline R-salt; the formation of a pale purple color indicated the presence of some unreacted 4,4'-diamino-stilbene-2,2'-disulfonic acid. Five additional parts of 3,4-methylenedioxy-benzoyl chloride were then added, and reflux was continued for 1 hour. At the end of this time, the reaction mixture failed to give any coloration on treatment with cold nitrous acid and alkaline R-salt, showing that the reaction was essentially complete. The hot mixture was drowned into 1000 parts of water and made just alkaline with an aqueous solution of sodium hydroxide. The drowned product was treated with 150 parts of salt, filtered and washed free of excess alkali with 5% salt solution. The crude product was dissolved in 6000 parts of boiling water and treated with decolorizing carbon; the mixture was then filtered hot to remove the carbon and 600 parts of salt were added to the filtrate. On cooling, the product separated and was filtered off and dried. The yellow product, sodium-4,4'-bis(3,4-methylenedioxy-benzoylamino)-stilbene - 2,2' - disulfonate was substantive to cellulosic fiber from an aqueous bath and imparted thereto a strong blue fluorescence.

The product in the above example has been isolated as the disodium salt of the sulfonic acid groups. By using potassium hydroxide in lieu of sodium hydroxide, the product may be obtained as the dipotassium sulfonate. Isolation as the free disulfonic acids can be effected by acidification of the condensation mass, and the products thus obtained may be reacted with ammonium hydroxide or any suitable organic or inorganic base, to yield the corresponding salt.

In a similar manner, the analogous product having a dioxy-ethylene group in positions 3,4 of each benzoyl radical may be prepared in the form of disodium salt, dipotassium salt, free disulfonic acid, diammonium sulfonate, etc.

Evaluation of the product of the above example on textile fiber has shown it to be a blue-fluorescent dye capable of imparting a stronger whitening effect to cellulosic fibers than the bis-p-methyl derivative of dibenzoylamino-stilbene-disulfonic acid which has previously been disclosed in the patent literature.

The following comparisons were made on dyeings of various fluorescents on paper, by using the beater-dyeing technique and judging the dyed paper in diffuse daylight:

General formula:

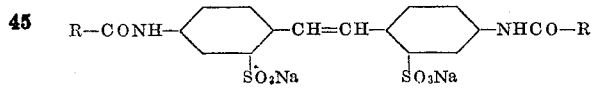

| Particular compound | R | Grams |
|---|---|---|
| p-methyl | 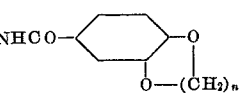 | 100 |
| 3,4-dimethoxy |  | 36 |
| 3,4-methylenedioxy |  | 75 |

The column marked "Grams" shows the weights of the particular substances required to achieve a certain degree of whitening assumed as standard.

Study of the above data shows that on a weight basis, the potency of the new compounds of this invention as whitening agents stands between that of the 3,4-dimethoxy derivative and that of the p-methyl derivative.

In addition to producing a whitening effect upon textile material, our novel compounds may also be used for various other purposes where fluorescence or absorption of ultra-violet light is desirable, for instance to achieve fluorescent effects in costumes or stage settings, to achieve novel effects on photographic paper, as ultraviolet filters when impregnated on cellulosic fibers used for wrapping materials, etc.

We claim as our invention:

1. A compound of the general formula

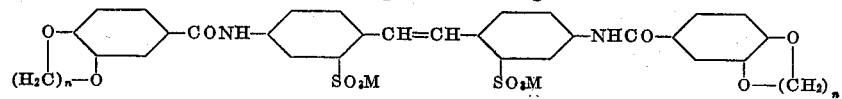

wherein M stands for a member of the group consisting of hydrogen, the alkali-metals and ammonium, while $n$ is a numeral not greater than 2.

2. 4,4'-bis(3,4-methylenedioxy - benzoylamino) - stilbene-2,2'-disodium sulfonate.

3. 4,4'-bis(3,4-methylenedioxy - benzoylamino) - stilbene-2,2'-disulfonic acid.

4. A compound of the formula:

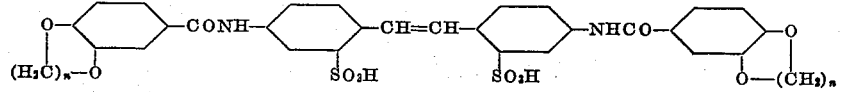

wherein $n$ is a numeral not greater than 2.

No references cited.